(12) United States Patent
Sicilia

(10) Patent No.: US 12,629,881 B2
(45) Date of Patent: May 19, 2026

(54) POST-MOLD PROCESSING OF PREFORMS

(71) Applicant: F&S Tool, Inc., Erie, PA (US)

(72) Inventor: Robert D. Sicilia, Ontario (CA)

(73) Assignee: F&S Tool, Inc., Erie, PA (US)

( * ) Notice: Subject to any disclaimer, the term of this patent is extended or adjusted under 35 U.S.C. 154(b) by 73 days.

(21) Appl. No.: 18/339,165

(22) Filed: Jun. 21, 2023

(65) Prior Publication Data

US 2023/0405911 A1 Dec. 21, 2023

Related U.S. Application Data

(60) Provisional application No. 63/353,880, filed on Jun. 21, 2022.

(51) Int. Cl.
B29C 49/64 (2006.01)
B29C 45/72 (2006.01)

(52) U.S. Cl.
CPC ...... B29C 49/6435 (2022.05); B29C 45/7207 (2013.01); *B29C 2045/7235* (2013.01)

(58) Field of Classification Search
CPC ........... B29C 49/6435; B29C 45/7207; B29C 2045/7235; B29C 45/0053; B29C 49/683; B29C 49/6465; B29C 49/6467; B29C 49/061; B29C 2045/7214; B29C 2049/023; B29C 2049/7862; B29C 49/681; B29C 2949/0715; B29C 49/6427
See application file for complete search history.

(56) References Cited

U.S. PATENT DOCUMENTS 4,729,732 A 3/1988 Schad et al.
4,836,767 A 6/1989 Schad et al.

| RE33,237 E | 6/1990 | Delfer, III | |
| 5,206,039 A | 4/1993 | Valyi | |
| 5,582,788 A | 12/1996 | Collette et al. | |
| 6,139,789 A | 10/2000 | Neter et al. | |
| 7,264,464 B2 | 9/2007 | Unterlander et al. | |
| 7,648,662 B2 | 1/2010 | Pesavento | |
| 2006/0204608 A1* | 9/2006 | Neter .................. | B29C 49/6427 |
| | | | 425/526 |
| 2011/0033569 A1 | 2/2011 | Niewels | |
| 2017/0291334 A1 | 10/2017 | Aktas | |

FOREIGN PATENT DOCUMENTS

CN 1481301 A 3/2004

OTHER PUBLICATIONS

European Patent Office, "International Search Report and Written Opinion," issued in related International Patent Application No. PCT/US2023/025900, mailed Oct. 2, 2023 (16 pages).

* cited by examiner

*Primary Examiner* — S. Behrooz Ghorishi

(74) *Attorney, Agent, or Firm* — Barnes & Thornburg LLP

(57) ABSTRACT

Devices, systems, and methods are generally directed to cooling preforms in a receptacle having a controllable shape. As compared to cooling preforms in a receptacle having a fixed shape, the devices, systems, and method of the present disclosure may facilitate faster and more reliable post-processing of preforms. As an example, the devices, systems, and methods of the present disclosure may reduce the likelihood of transfer issues associated with moving a preform into the cavity while also facilitating faster cooling of the preform disposed in the receptacle.

20 Claims, 10 Drawing Sheets

POST-MOLD PROCESSING OF PREFORMS

CROSS-REFERENCE TO RELATED APPLICATIONS

This application claims the benefit of priority to U.S. Provisional Patent Application No. 63/353,880, entitled "POST-MOLD PROCESSING OF PREFORMS," filed Jun. 21, 2022, the entire contents of which are hereby incorporated herein by reference.

BACKGROUND

Preforms are intermediate products formed through injection molding of material such as polyethylene terephthalate (PET). Through subsequent processing that includes blow-molding, these preforms can be formed into thin-walled, containers and/or packaging commonly used in high-volume production (e.g., food processing). For example, preforms can be formed into containers used in bottling liquids (e.g., soft drinks, water, etc.).

Preforms are typically malleable following removal from an injection molding machine. To increase manufacturing throughput, these preforms can be removed from an injection molding machine while the preforms are still malleable and then cooled, away from the injection molding machine, until the preforms have been cooled into a dimensionally stable form. Once dimensionally stable, the preforms can be transferred to one or more blow molding stages for formation into a final shape of a container and/or packaging.

To promote fast cooling, the receptacle is sized to have an interference fit with the malleable form of the preform initially introduced into the receptacle. The fastest cooling is generally achieved by sizing the diameter of the receptacle according to the final (dimensionally stable) diameter of the preform. However, the interference fit associated with such relative sizing can create significant transfer issues as the malleable form of the preform is introduced into the receptacle. Thus, as a compromise between reliable transfer of malleable preforms into the receptacle and efficient cooling of such preforms in the receptacle, the interference fit between the diameter of the receptacle and the corresponding diameter of the malleable preform is typically about one-half of the total shrinkage of the diameter of the preform as the preform is cooled in the receptacle. That is, reliable transfer of malleable preforms into the receptacle is generally achieved at the cost of decreased cooling efficiency.

SUMMARY

Devices, systems, and methods of the present disclosure are generally directed to cooling preforms in a receptacle having a controllable shape. As compared to cooling preforms in a receptacle having a fixed shape, the devices, systems, and method of the present disclosure may facilitate faster and more reliable post-processing of preforms. As an example, the devices, systems, and methods of the present disclosure may reduce the likelihood of transfer issues associated with moving a preform into the cavity while also facilitating faster cooling of the preform disposed in the receptacle.

According to one aspect, a cooling device for post-mold processing a preform may include a base defining a chamber, a receptacle disposed in the chamber, the receptacle including a first end section, a second end section, and a flexible section therebetween, the first end section defining and a first opening, and the flexible section defining at least one portion of a cavity, and an actuator actuatable to change radial force on the flexible section of the receptacle and, in response to the change in radial force on the flexible section of the receptacle, the flexible section of the receptacle elastically deformable between an expanded state and a compressed state relative to a longitudinal axis transverse to the radial force and defined by the at least one portion of the cavity.

In certain implementations, the base may define one or more cooling passages in thermal communication with the at least one portion of the cavity at least in the compressed state of the flexible section of the receptacle in the chamber defined by the base. The one or more cooling passages may be fluidically isolated from the cavity. Further or instead, the one or more cooling passages may circumscribe the at least one portion of the cavity defined by the flexible section of the receptacle. As an example, the one or more cooling passages may include a helically-shaped cooling passage.

In some implementations, the base and at least the flexible section of the receptacle may each be formed of one or more metals.

In certain implementations, the first end section may be wider than the second end section in each of the compressed state and the expanded state.

In some implementations, at least the second end section may be less flexible than the flexible section in response to changes in the radial force on the flexible section of the receptacle.

In certain implementations, at least in the compressed state of the flexible section of the receptacle, the at least one portion of the cavity is symmetric about any plane containing the longitudinal axis. In some instances, at least in the compressed state, the flexible section of the receptacle may circumscribe the longitudinal axis along the at least one portion of the cavity.

In some implementations, the flexible section of the receptacle may include a plurality of struts along the at least one portion of the cavity, the plurality of struts flexible in response to the change in radial force on the flexible section of the receptacle. In some instances, each one of the plurality of struts may have a thickness, in a radial direction relative to the longitudinal axis, of greater than about 25.4 microns along the at least one portion of the cavity. In certain instances, each one of the plurality of struts may be elongate along the at least one portion of the cavity. Further, or instead, in the compressed state of the flexible section of the receptacle, the plurality of struts may be adjacent to one another such that each one of the plurality of struts and another one of the plurality of struts define a respective slit therebetween. Additionally, or alternatively, a respective longitudinal dimension of each one of the plurality of struts may be substantially parallel to the longitudinal axis in at least one of the compressed state or the expanded state of the flexible section of the receptacle. In some instances, a respective longitudinal dimension of an outer surface each one of the plurality of struts may define a respective axis oblique to the longitudinal axis defined by the at least one portion of the cavity, and an angle between each one of the respective axes relative to the longitudinal axis increases as the flexible section of the receptacle elastically deforms from the compressed state to the expanded state.

In certain implementations, the actuator may be pneumatically actuatable to move the flexible section of the receptacle between the expanded state and the compressed state. For example, the actuator may be pneumatically actuatable in at least one direction in response to pressurized air. As a more specific example, the actuator may be pneumatically actuatable in at least one direction in response to pressurized air having gauge pressure greater than about 2.5 atm and less than about 9 atm.

In some implementations, the actuator may be actuatable to change the radial force on the flexible section of the receptacle substantially uniformly about a circumference of the flexible section circumscribing the longitudinal axis in the at least one portion of the cavity.

In certain implementations, the second end section may define a second opening having a cross-sectional area smaller than the first opening, the base defines at least a portion of a manifold in fluid communication with the cavity via the second opening.

In some implementations, the actuator may include a membrane disposed between the base and the flexible section of the receptacle, the membrane and the base define a channel therebetween and, in response to pressure differences between the channel and the at least one portion of the cavity, movement of the membrane changes the radial force on the flexible section of the receptacle and elastically deforms the flexible section of receptacle between the expanded state and the compressed state. The membrane may be pliable along the channel. Further, or instead, the membrane may be in contact with the flexible section of the receptacle defining the cavity at least in the compressed state of the flexible section of the receptacle. In some instances, the membrane may include one or more elastomeric materials. Additionally, or alternatively, the channel defined between the membrane and the base may be fluidically isolated from one or more cooling passages defined by the base. In some instances, the channel defined between the membrane and the base may be fluidically isolated from the at least one portion of the cavity. In certain instances, the flexible section of the receptacle may be continuous along the at least one portion of the cavity. As an example, the flexible section of the receptacle may have a thickness, in a radial direction, of less than about 25.4 microns along the at least one portion of the cavity. In some instances, the flexible section of the receptacle may be biased toward the expanded state in absence of a pressure difference between the channel and the at least one portion of the cavity. Further, or instead, the flexible section of the receptacle may be compressible from the expanded state to the compressed state in response to a pressure difference greater than about 2.5 atm and less than about 9 atm between the channel and the at least one portion of the cavity. Still further, or instead, at a temperature of 100° C., the membrane may be elastically deformable in response to a pressure difference between the channel and the at least one portion of the cavity. In certain instances, the channel may circumscribe the longitudinal axis at least along the flexible section of the receptacle. Additionally, the channel may be an annulus about the longitudinal axis. Additionally, or alternatively, the first opening defined by the first end section of the receptacle may remain the same size as the flexible section of the receptacle elastically deforms between the expanded state and the compressed state.

In certain implementations, the base may include an inner surface having a wedge-shape sloping radially away from the longitudinal axis in a direction from the second end section to the first end section of the receptacle, and the first end section of the receptacle is supported on the wedge-shape of the inner surface of the base at least with the flexible section of the receptacle in the compressed state. In some instances, the cooling device may further include a cap supported on the base, wherein, at least with the flexible section of the receptacle in the expanded state, the cap and the first end section of the receptacle collectively form a substantially continuous surface adjacent to the first opening defined by the first end section of the receptacle. The cap may include a lip, the actuator actuatable to move the receptacle in a forward direction along the longitudinal axis toward the cap, the flexible section of the receptacle is slidable along the wedge-shape of the inner surface of the base and into engagement with the lip as the receptacle moves in the forward direction and, with the flexible section of the receptacle engaged with the lip, radial movement of the flexible section of the receptacle toward the longitudinal axis is restricted such that the lip holds the flexible section of the receptacle in the expanded state. As a more specific example, the actuator may be actuatable to move the receptacle in a backward direction along the longitudinal axis away from the cap, the flexible section of the receptacle disengages with the lip as the receptacle slides along the wedge-shape of the inner surface and moves in the backward direction and, with the flexible section of the receptacle disengaged from the lip, the flexible section of the receptacle is radially movable toward the longitudinal axis such that the flexible section of the receptacle moves from the expanded state to the compressed state. In some instances, the flexible section of the receptacle may be spring-biased toward the compressed state. Further, or instead, in the absence of external radial force on the flexible section of the receptacle, an outer surface of the flexible section may be frustoconical. Still further, or instead, the actuator may include a piston in mechanical communication with the receptacle, the cap is supported on the base and includes a lip, the piston is movable parallel to the longitudinal axis to move the receptacle in at least one of the forward direction or the backward direction along the longitudinal axis. The piston may be pneumatically actuatable to move the receptacle in at least one of the forward direction or the backward direction along the longitudinal axis. As an example, the piston may be pneumatically actuatable with pressurized air having gauge pressure of greater than about 2 atm and less than about 9 atm to move the receptacle in at least one of the forward direction or the backward direction along the longitudinal axis. Further, or instead, the piston may be pneumatically actuatable to move the receptacle in each of the forward direction and the backward direction along the longitudinal axis. In certain instances, the cooling device may further include a piston manifold, wherein the piston has a first side and a second side, the first side and the second side are opposite one another and fluidically isolated from one another in the piston manifold, the piston is pneumatically actuatable to move the receptacle in the forward direction in response to pneumatic pressure directed through the piston manifold to the first side of the piston, and the piston is pneumatically actuatable to move the receptacle in the backward direction in response to pneumatic pressure directed through the piston manifold to the second side of the piston. Further, or instead, the cooling device may further include one or more connecting rods, wherein the piston is mechanically coupled to the receptacle via the one or more connecting rods.

According to another aspect, a method of post-mold processing may include inserting a body portion of a preform into a cavity defined by a receptacle disposed in a chamber defined by a base, compressing a flexible section of the receptacle into a compressed state in contact with the body portion of the preform in the cavity, cooling the body portion of the preform in contact with the flexible section of the receptacle in the compressed state, with the body portion of the preform cooled, expanding the flexible section of the receptacle to an expanded state away from contact with the body portion of the preform to define a clearance therebetween, with the clearance defined between the flexible section of the receptacle and the body portion of the preform, removing the body portion of the preform from the cavity.

In certain implementations, the body portion of the preform may be inserted into the cavity with the clearance defined between the flexible section of the receptacle and the body portion of the preform.

In some implementations, the body portion of the preform may be inserted into cavity with a neck portion of the preform outside of the cavity and the body portion of the preform spaced away from the flexible section of the receptacle in the cavity. For example, inserting the body portion of the preform into the cavity may include positioning a closed portion of the preform in contact with the receptacle with the body portion of the preform spaced away from the flexible section of the receptacle. In certain instances, inserting the body portion of the preform into the cavity may include applying vacuum pressure along the closed portion of the preform in contact with the receptacle. Further, or instead, removing the body portion of the preform from the cavity may include delivering pressurized air into the cavity to move the closed portion of the preform away from contact with the receptacle.

In certain implementations, the flexible section of the receptacle may define a longitudinal axis extending through the cavity, and compressing the flexible section of the receptacle into contact with the body portion of the preform in the cavity includes decreasing a radial dimension of the flexible section of the receptacle from the expanded state to the compressed state. As an example, the preform may be formed of polyethylene terephthalate (PET), cooling the body portion of the preform may shrinks the body portion of the preform in the radial dimension, and compressing the flexible section of the receptacle may include reducing the radial dimension of the flexible section of the receptacle by more than 50 percent of shrinkage, in the radial dimension, associated with cooling the body portion of the preform. In some instances, expanding the flexible section of the receptacle may include increasing the radial dimension of the flexible section of the receptacle to move the flexible section of the receptacle from the compressed state to the expanded state, out of contact with the body portion of the preform.

In some implementations, cooling the body portion of the preform in contact with the flexible section of the receptacle may include moving a coolant (e.g., water) through a cooling circuit fluidically isolated from the cavity and in thermal communication with the body portion of the preform in the cavity. As an example, the coolant in the cooling circuit may have a maximum pressure of between about 4 atm and about 9 atm.

In certain implementations, the method may further include receiving a feedback signal indicative of a temperature of the body portion of the preform in the cavity, wherein expanding the flexible section of the receptacle away from the body portion of the preform is based on comparison of the temperature of the body portion to a predetermined target temperature.

In some implementations, compressing the flexible section of the receptacle into contact with the body portion of the preform in the cavity may include increasing fluid pressure in a channel in mechanical communication with the flexible section. For example, increasing the fluid pressure in the channel may include directing pressurized air into the channel. Additionally, or alternatively, increasing the fluid pressure in the channel may include forming a pressure difference between the channel and the cavity of greater than about 2.5 atm and less than about 9 atm. In some instances, increasing the fluid pressure in the channel may include increasing the fluid pressure in the channel according to a step function. In other instances, increasing the fluid pressure in the channel may include increasing the fluid pressure in the channel according to a continuous function over a predetermined period. Further, or instead, expanding the flexible section of the receptacle away from contact with the body portion of the preform may include decreasing the fluid pressure in the channel. For example, decreasing the fluid pressure in the channel may include interrupting a flow of fluid into the channel.

In certain implementations, compressing the flexible section of the receptacle into the compressed state in contact with the body portion of the preform in the cavity may include moving the receptacle along a longitudinal axis, with movement of the receptacle along the longitudinal axis increasing a radial force on the flexible section of the receptacle. In some instances, expanding the flexible section of the receptacle to the expanded state away from contact with the body portion of the preform in the cavity may include moving the receptacle along the longitudinal axis, with movement of the receptacle along the longitudinal axis decreasing the radial force on the flexible section of the receptacle. As an example, compressing the flexible section of the receptacle into the compressed state in contact with the body portion of the preform in the cavity may include moving the receptacle in a backward direction further into the cavity, and expanding the flexible section of the receptacle to the expanded state away from contact with the body portion of the preform in the cavity may include moving the receptacle in a forward direction opposite the backward direction. For example, moving the receptacle in the forward direction and in the backward direction may include sliding the receptacle along a wedge-shape of an inner surface of the base defining the chamber with the wedge-shape sloping radially outward as the receptacle moves in the forward direction. Further, or instead, moving the receptacle in at least one of the forward direction or the backward direction may include actuating a piston in mechanical communication with the receptacle. Actuating the piston may include pneumatically actuating the piston in at least one of the backward direction or the forward direction. Pneumatically actuating the piston may include actuating the piston with air pressurized to gauge pressure greater than about 2 atm and less than about 9 atm. Additionally, or alternatively, the flexible section of the receptacle may be spring-biased toward the compressed state, and expanding the flexible section of the receptacle to the expanded state away from contact with the body portion of the preform in the cavity includes engaging the flexible section of the receptacle on a lip restricting radial movement of the flexible section of the receptacle toward the compressed state.

According to yet another aspect, a system for post-mold processing may include an end-of-arm tool including one or more instances of the foregoing cooling devices, a robot coupled to the end-of-arm tool, the robot operable to move the one or more preforms into a respective instance of the cooling device; and a controller in electrical communication with the robot and the cooling device, the controller including one or more processors and one or more non-transitory, computer-readable storage media, the one or more non-transitory, computer-readable storage media having stored thereon instructions for causing the one or more processors to carry out operations according to any one of the foregoing methods.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

Like reference symbols in the various drawings indicate like elements.

DETAILED DESCRIPTION

Figure 1:
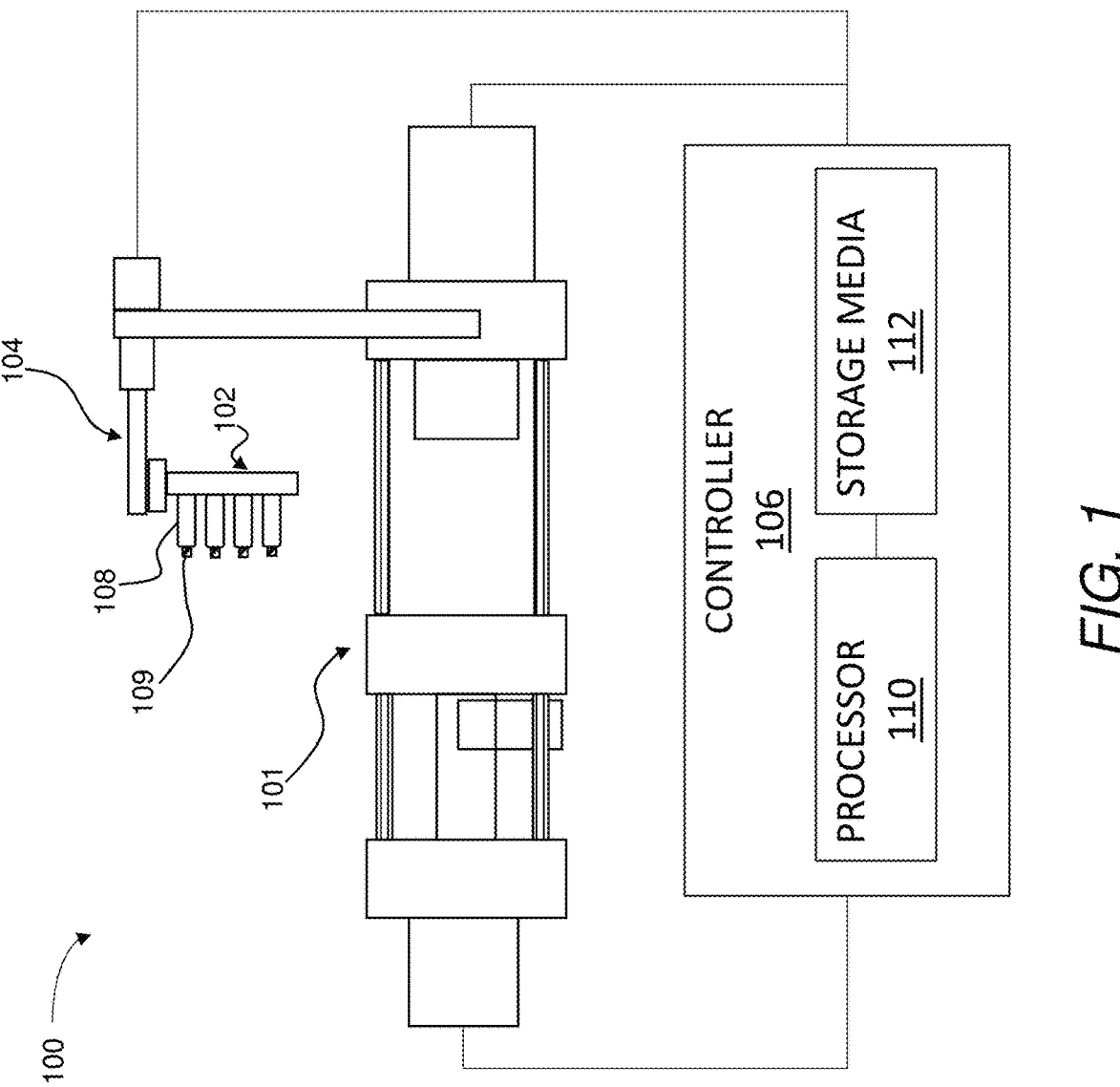
FIG. 1 is a schematic representation of a system for post-mold processing a preform.
Figure 2A:
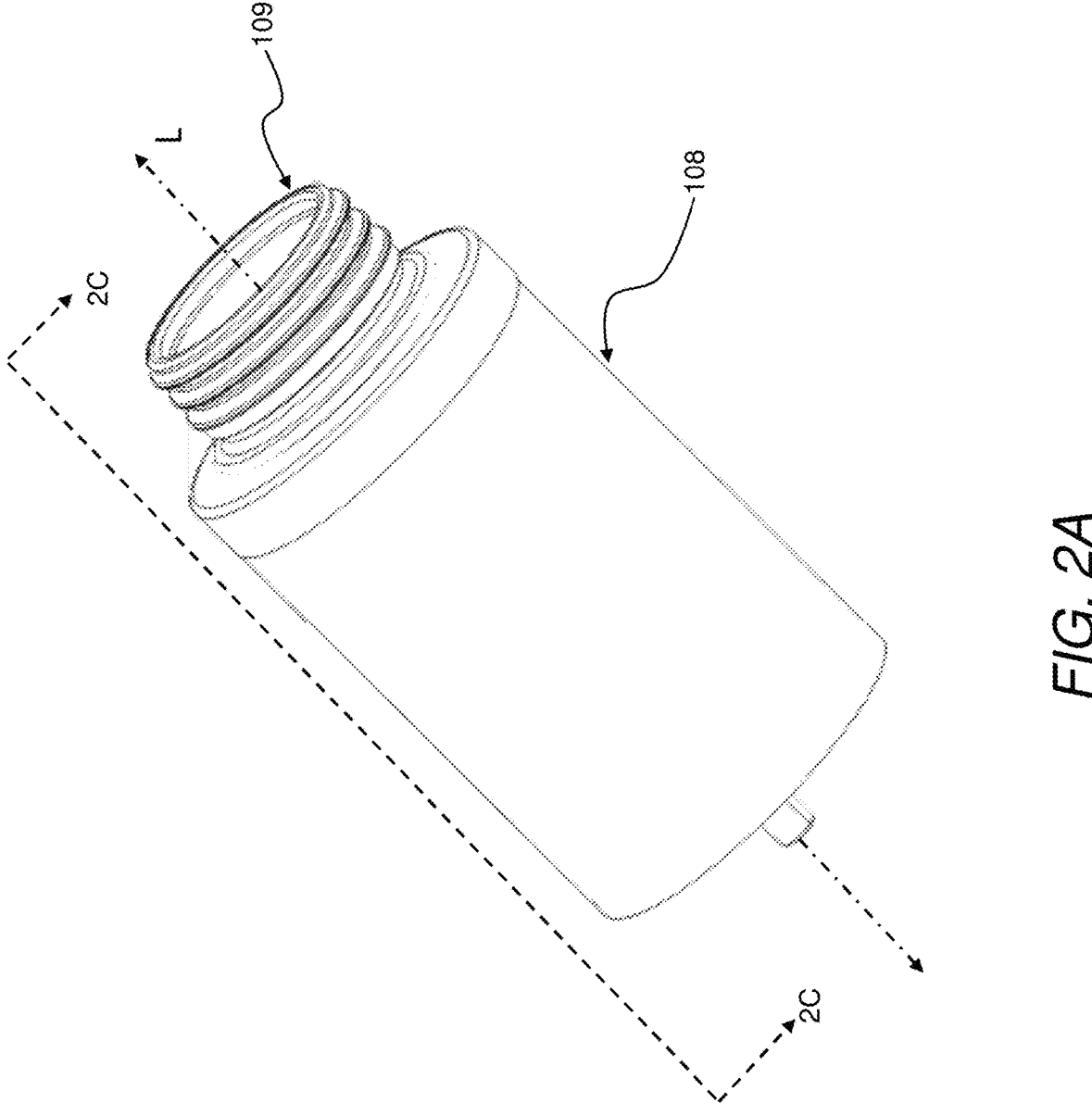
FIG. 2A is a perspective view of a cooling device of the system of FIG. 1, the cooling device including a membrane and the cooling device shown with a preform shown positioned in the cooling device.
Figure 2B:
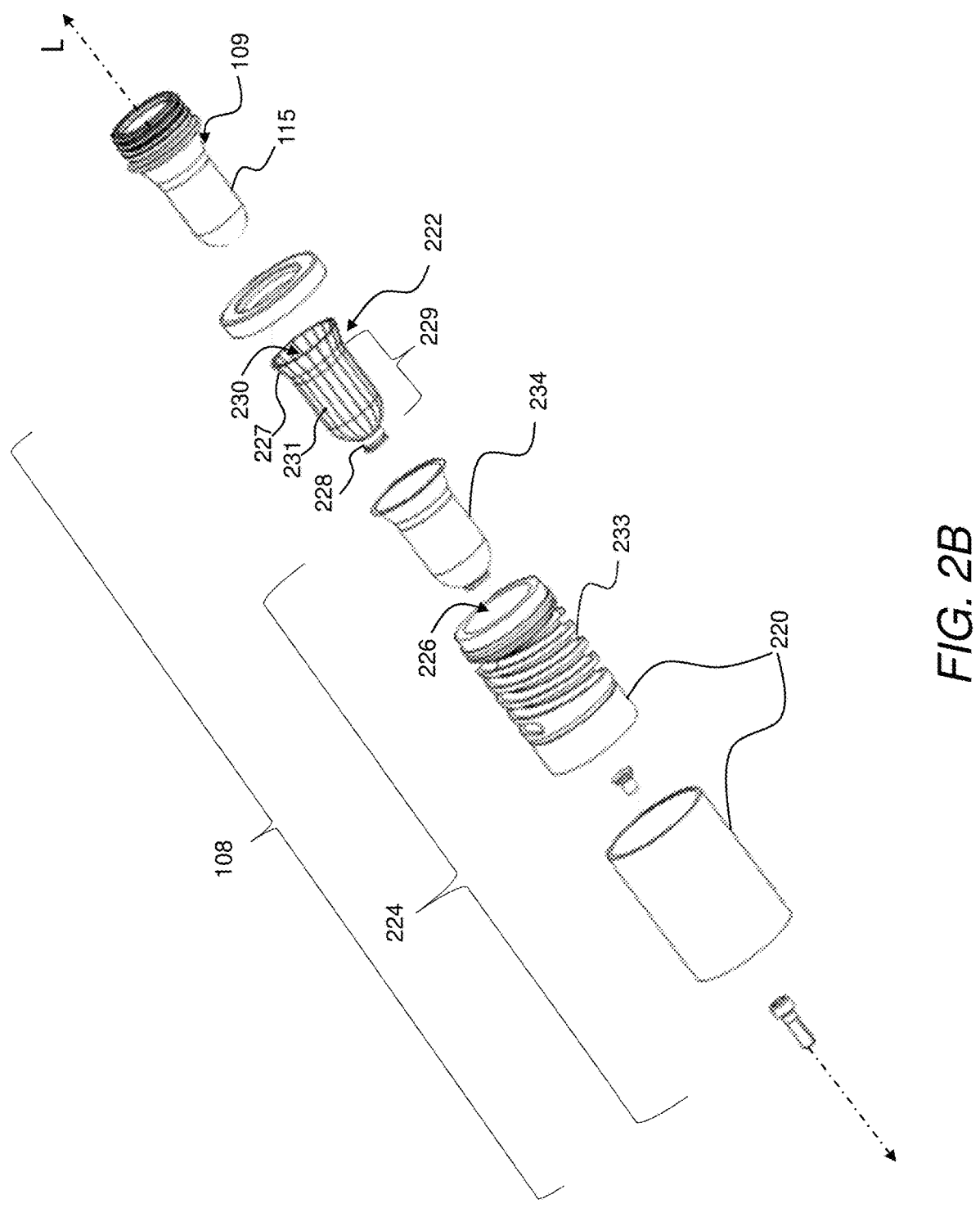
FIG. 2B is a perspective of the cooling device of FIG. 2A, with the cooling device shown exploded along a center axis defined by the cooling device.
Figure 2C:
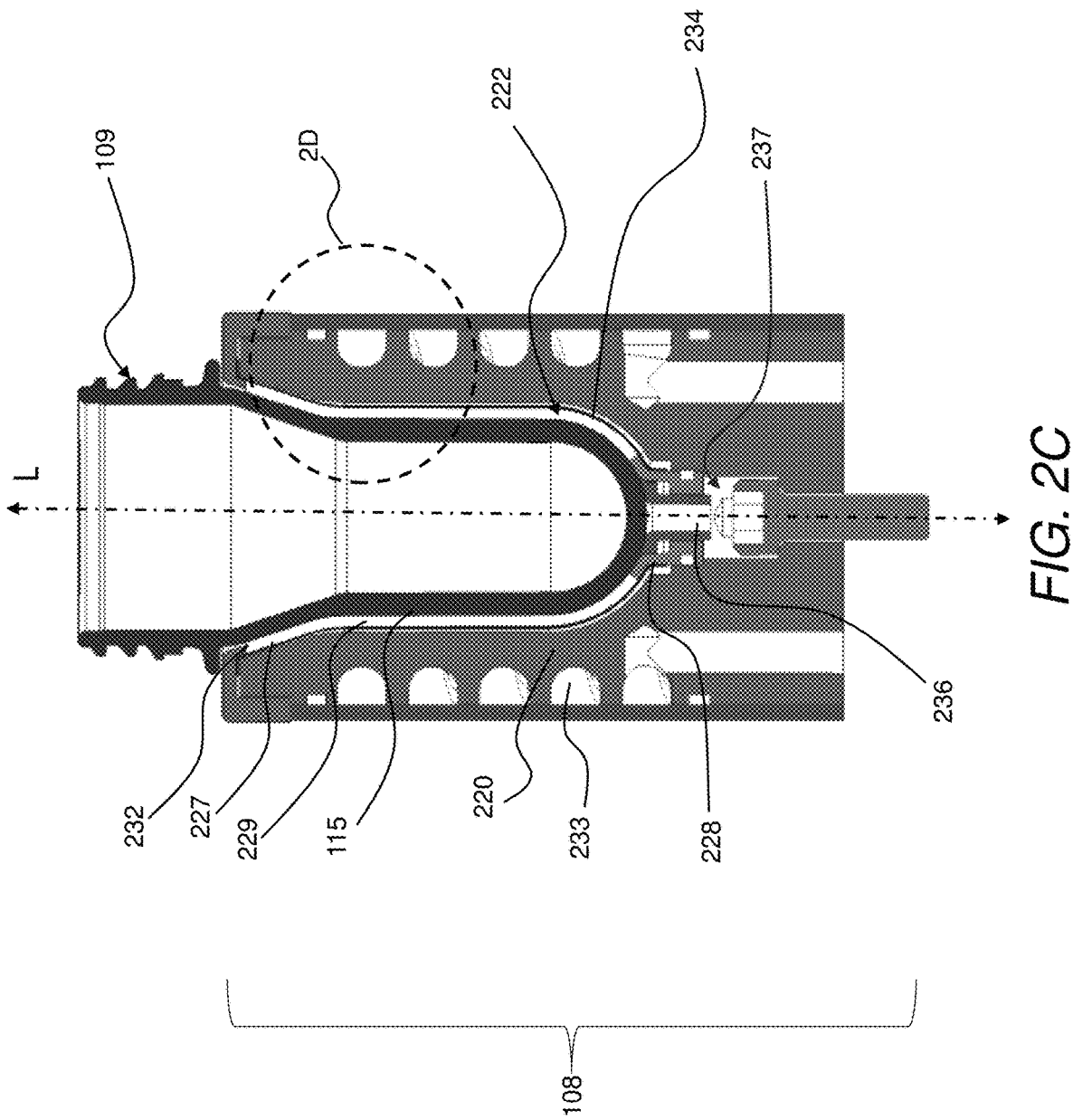
FIG. 2C is a side, cross-sectional view of the cooling device of FIG. 2A, with the cross-sectional view taken along line 2C-2C in FIG. 2A.
Figure 2D:
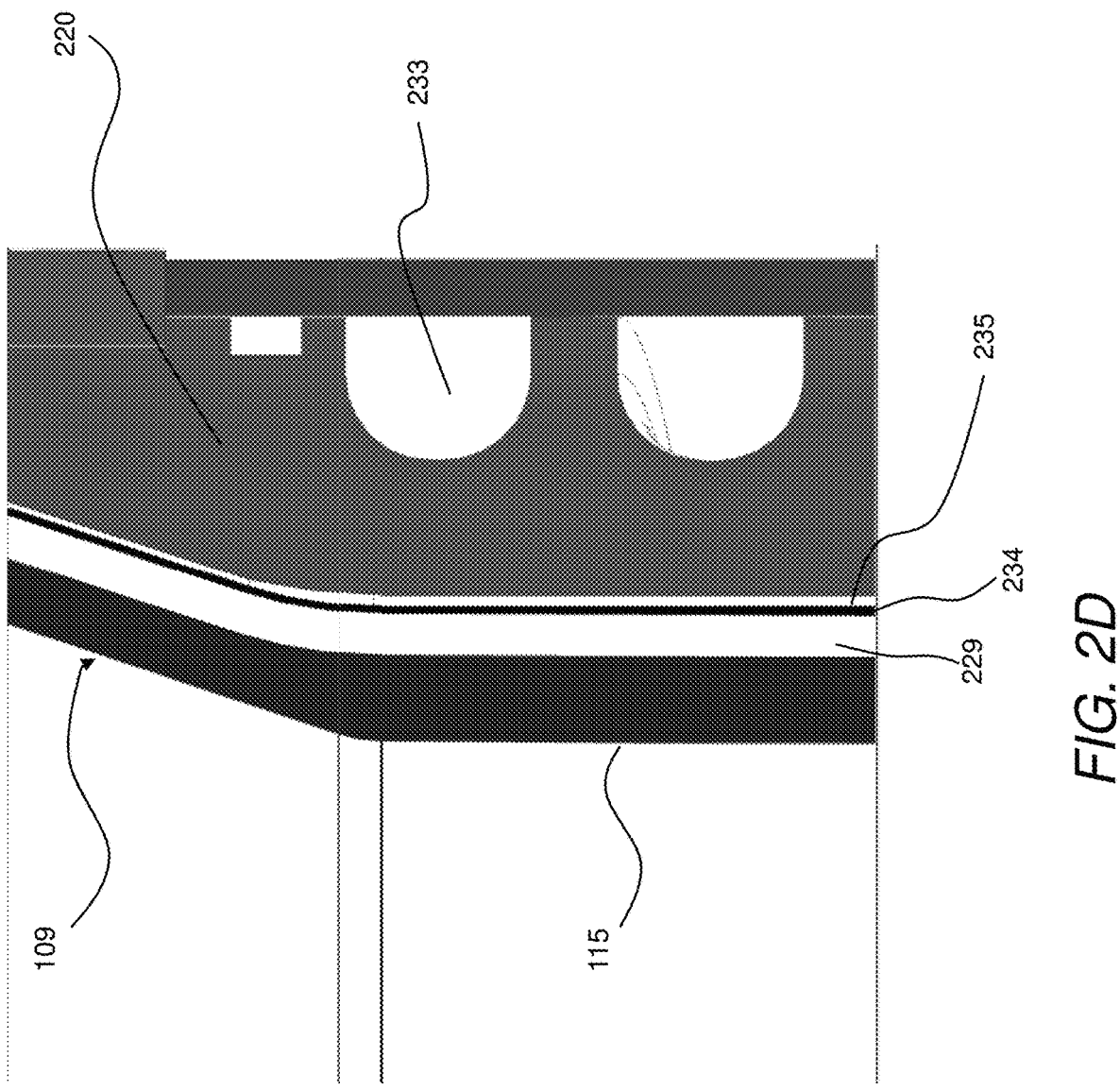
FIG. 2D is an enlarged view of the cooling device of FIG. 2A along the area the area of detail 2D in FIG. 2C.

Embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better describe the embodiments and does not pose a limitation on the scope of those embodiments. No language in the specification should be construed as indicating any unclaimed element as essential to the practice of the disclosed embodiments.

As used herein, unless otherwise specified or made clear from the context, the term "radial force" shall be understood to refer to a net force in a radial direction relative to a longitudinal axis defined by a cavity. Thus, a change in radial force shall be understood to refer to a change in a net radial force. As a specific example, a change in radial force to flex a portion of a cavity from an expanded state to a compressed state shall be understood to be a change in radial force distribution on the cavity to produce a net radial force directed radially toward the longitudinal axis of the cavity. As another example, a change in radial force to flex a portion of a cavity from a compressed state to an expanded state shall be understood to be a change in radial force distribution on the cavity to produce a net radial force directed radially away from the longitudinal axis of the cavity. Further, or instead, unless a contrary intent is explicitly indicated, the term radial force shall be understood to refer to a force distribution that is substantially uniformly distributed about a circumference of the cavity, allowing for small deviations from uniformity associated with variations in properties of nominally identical materials and/or variations associated with machine tolerances.

Referring now to FIGS. 1 and 2A-2D, a system 100 for post-mold processing may include an end-of-arm tool 102, a robot 104, and a controller 106. The end-of-arm tool 102 includes one or more instances of a cooling device 108, with each instance of the cooling device 108 operable for post-mold processing a respective instance of a preform 109 according to the various different techniques described herein. The robot 104 may be coupled to the end-of-arm tool, and the robot 104 may be operable to move the preform 109 from an injection molding machine 101 and into a respective instance of the cooling device 108. The controller 106 may include one or more instances of a processor 110 and one or more non-transitory, computer-readable storage media 112. The one or more non-transitory, computer-readable storage media 112 may have stored thereon instructions for causing the one or more instances of the processor 110 to carry out operations according to any one or more of the various different methods described herein.

The cooling device 108 may include a base 220, a receptacle 222, and an actuator 224. The receptacle 222 may be disposed in a chamber 226 defined by the base 220. The receptacle 222 may include a first end section 227, a second end section 228, and a flexible section 229 therebetween, with the flexible section 229 defining at least one portion of a cavity 230. The actuator 224 may be actuatable to change radial force on the flexible section 229 of the receptacle 222. As described in greater detail below, in response to the change in radial force on the flexible section 229 of the receptacle 222, the flexible section 229 of the receptacle 222 may be elastically deformable between an expanded state and a compressed state relative to a longitudinal axis L transverse to the radial force and defined by the at least one portion of the cavity 230. This radial force on the flexible section 229 of the receptacle 222 may be controlled to adjust the shape of the flexible section 229—and, thus, the shape of the at least one portion of the cavity 230—between a loose clearance fit and an interference fit relative to the preform 109 positioned in the cavity 230 of the receptacle 222. As compared to a receptacle having a fixed dimension, controlled adjustment of the shape of the at least one portion of the cavity 230 defined by the flexible section 229 of the receptacle 222 may reduce the likelihood of transfer issues associated with moving the preform 109 into the cavity 230 with a loose clearance fit associated with the expanded state of the flexible section 229 of the receptacle 222. Additionally, or alternatively, as also compared to a receptacle having a fixed dimension, controlled adjustment of the shape of the at least one portion of the cavity 230 defined by the flexible section 229 of the receptacle 222 may facilitate achieving more efficient (e.g., faster) cooling of the preform 109 disposed in the cavity 230 with an interference fit associated with the compressed state of the flexible section 229 of the receptacle 222. Alone, or in combination, such improvements may facilitate achieving more consistent quality of multiple instances of the preform 109 while reducing cycle time associated with forming and cooling multiple instances of the preform 109. At scale, one or more of these improvements may represent significant cost savings as compared to cooling preforms in a receptacle having a fixed dimension.

In general, the flexible section 229 of the receptacle 222 may undergo any one or more of various, different radial shape changes useful for insertion of the preform 109 into the cavity with a loose clearance fit relative to the receptacle 222 in the expanded state and for cooling the preform 109 in the cavity with an interference fit between the preform 109 and the receptacle 222 in the compressed state. For example, the flexible section 229 of the receptacle 222 may be substantially uniformly flexible along the flexible section 229 such that substantially uniform radial force may be applied along the flexible section 229 to move the flexible section 229 between the expanded state and the compressed state. In this context, substantial uniformity shall be understood to allow for deviations associated with manufacturing and calibration tolerances and, in combination, such deviations may be sufficiently small that the longitudinal axis L remains substantially in the same position in the cavity 230 as the flexible section 229 flexes between the expanded state and the compressed state. It shall be appreciated that the longitudinal axis L in substantially the same position in the cavity 230 throughout movement of the flexible section 229 between the expanded state and the compressed state may reduce the likelihood that moving the flexible section 229 between the expanded state and the compressed state may introduce unintended defect modes to the preform 109.

In certain implementations, at least in the compressed state of the flexible section 229 of the receptacle 222, the at least one portion of the cavity 230 may be symmetric about any plane containing the longitudinal axis. As compared to an asymmetric cavity, the symmetry of the at least one portion of the cavity 230 at least in the compressed state may facilitate more uniform contact between the flexible section 229 of the receptacle 222 and the preform 109. In turn, such improvement in uniformity of contact between the flexible section 229 of the receptacle 222 and the preform 109 may facilitate achieving more uniform and repeatable cooling of the preform 109, thus improving consistency, quality, and/or throughput of cooled instances of the preform 109.

Additionally, or alternatively, at least in the compressed state, the flexible section 229 of the receptacle 222 may circumscribe the longitudinal axis L along at least one portion of the cavity 230. This may be useful, for example, for substantially uniformly engaging with a circumference of the preform 109 as an increase in radial force is applied substantially uniformly about the circumference of the flexible section 229 of the receptacle 222 according to any one or more of the various different techniques described herein. Such substantially uniform engagement of the flexible section 229 of the receptacle 222 about the circumference of the preform 109 may, among other things, facilitate achieving substantially uniform cooling of the preform 109, thus improving uniformity of the preform 109 after cooling as compared to less uniform engagement of preforms associated with fixed-sized cavities.

In some implementations, the receptacle 222 may be flexible along the flexible section 229 such that the receptacle 222 does not undergo substantial foreshortening (allowing for small changes in size that do not impact operation of the flexible section 229) as the flexible section 229 moves from between the expanded state and the compressed state. Additionally, or alternatively, the flexible section 229 may be movable between the expanded state and the compressed state over many cycles of expansion and compression with little or no variation. It shall be appreciated that each of these features alone, or in combination, may be useful for reliable production of cooled preforms in high volumes according to any one or more of the various different techniques described herein.

The flexible section 229, in certain instances, may include a plurality of struts 231 along the at least one portion of the cavity 230 defined by the flexible section 229. Respective ends of the plurality of struts 231 may be fixedly attached to (e.g., continuously formed with) each one of the first end section 227 and the second end section 228 with each one of the plurality of struts 231 extends longitudinally along the cavity 230. With the respective ends of the plurality of struts 231 so attached to the first end section 227 and to the second end section 228, each one of the plurality of struts 231 may be flexible relative to one another between the first end section 227 and the second end section 228 as a radial force on the flexible section 229 of the receptacle 222 changes.

As an example, in response to an increase in radial force on the plurality of struts 231 in a radial direction toward the longitudinal axis L, the plurality of struts 231 may flex radially inward toward the longitudinal axis L to form the compressed state of the flexible section 229 of the receptacle 222. In particular, with the flexible section 229 of the receptacle 222 in the compressed state, the plurality of struts 231 may be adjacent to one another such that each one of the plurality of struts 231 and another one of the plurality of struts 231 define a respective slit therebetween. As compared to larger spacing between the plurality of struts 231 in the expanded state, the adjacency of the plurality of struts 231 relative to one another in the compressed state may facilitate achieving better and/or more uniform heat transfer from the preform 109 to the plurality of struts 231 in the cavity 230.

As an additional or alternative example, in response to an increase in radial force on the plurality of struts 231 in a radial direction away from the longitudinal axis L, the plurality of struts 231 may flex radially outward away from the longitudinal axis L to form the expanded state of the flexible section 229 of the receptacle 222. As the plurality of struts 231 flex radially outward, the circumferential spacing between adjacent instances of the plurality of struts 231 may increase. As compared to the plurality of struts 231 in the compressed state, the larger spacing between adjacent instances of the plurality of struts 231 in the expanded state may facilitate inserting the preform 109 into the cavity 230 and/or removing the preform 109 from the cavity 230 with little or no interference by the plurality of struts 231.

Each one of the plurality of struts 231 may be elongate along the at least one portion of the cavity 230. For example, a respective longitudinal dimension of each one of the plurality of struts 231 along the cavity 230 may be substantially parallel to the longitudinal axis L in at least one of the compressed state or the expanded state of the flexible section 229 of the receptacle 222. Additionally, or alternatively, each one of the plurality of struts 231 may have a thickness, in a radial direction relative to the longitudinal axis L, of greater than about 25.4 microns along the at least one portion of the cavity 230 defined by the plurality of struts 231. Such thickness may be useful for, among other things, reducing the likelihood of stress failure of the plurality of struts 231 as the plurality of struts 231 undergo repeated flexing between the expanded state and the compressed state over many cycles (e.g., as part of a high-volume production process).

The first end section 227 of the receptacle 222 may define a first opening 232 through which a body portion 115 of the preform 109 may be inserted and/or removed while the second end section 228 of the receptacle 222 may accommodate connection of the base 220 in fluid communication with one or more fluid sources for cooling the preform 109 and/or for actuating the flexible section 229 of the receptacle 222 between the expanded state and the compressed state according to any one or more of the various, different techniques described herein. As an example, the first end section 227 may be wider than the second end section 228 in each of the compressed state and the expanded state of the flexible section 229 of the receptacle 222 to facilitate insertion and/or removal of a body portion 115 of the preform 109 into the first opening 232 while providing space for introduction of cooling fluid (e.g., water) into cooling passages 233 defined by the base 220 and for introduction of air pressure/vacuum pressure into the cavity 230, as described in greater detail below. Additionally, or alternatively, at least the second end section 228 of the receptacle 222 may be less flexible than the flexible section 229 in response to changes in the radial force on the flexible section 229 of the receptacle 222. Such relative stiffness of the second end section 228 may, for example, be useful for maintaining fluid connections with cooling fluid and/or with a pressurized air/vacuum source while the flexible section 229 undergoes movement between the expanded state and the compressed state. Further, or instead, the first opening 232 defined by the first end section 227 of the receptacle 222 may remain the same size as the flexible section 229 of the receptacle 222 elastically deforms between the expanded state and the compressed state. That is, the first end section 227 defining the first opening 232 may be rigid relative to the flexible section 229 of the receptacle 222 such that the first end section 227 may anchor the flexible section 229 along the first opening 232 and certain types of radial force (e.g., radial force imparted by a membrane, as described below) be efficiently transferred to the flexible section 229 of the receptacle 222 between the first end section 227 and the second end section 228.

In general, the actuator 224 may be actuatable at least once per expansion and compression cycle for receiving, cooling, and removing the preform 109 from the cavity 230 (e.g., actuatable for each of expansion and compression of the flexible section 229 or actuatable for one of expansion or compression of the flexible section 229 with spring force acting in the non-actuated direction). Additionally, or alternatively, the actuator 224 may be actuatable using any one or more types of energy to change radial force on the flexible section 229 of the receptacle 222 to move the flexible section 229 between the expanded state and the compressed state. Further, or instead, the actuator 224 may generally be actuatable to move the flexible section 229 in one or more radial directions (toward or away from the longitudinal axis L), in one or more longitudinal directions (toward or away from the first end section 227), or a combination thereof, to change radial force on the flexible section 229 to move the flexible section 229 between the expanded state and the compressed state.

In certain implementations, the actuator 224 may be pneumatically actuatable in at least one direction (e.g., in at least one radial direction relative to the longitudinal axis L) in response to pressurized air, which may advantageously produce actuation rapidly and with little or no need for moving parts that might otherwise wear down over time. As a specific example, the actuator 224 may be pneumatically actuatable in response to pressurized air having gauge pressure greater than about 2.5 atm and less than about 9 atm (e.g., a gauge pressure of about 7 atm). Pressurized air having gauge pressure in this range is commonly available and used in manufacturing of preforms (often referred to as "shop air"), thus facilitating implementation of the cooling device 108 without the need for additional equipment associated with actuation.

While the actuator 224 may be actuatable to change the radial force on the flexible section 229 of the receptacle 222 as a point force about a circumference on the flexible section 229, it shall be appreciated that the actuator 224 may be actuated to produce any one or more other types of radial force distributions about the circumference on the flexible section 229. For example, the actuator 224 may be actuatable to change the radial force on the flexible section 229 of the receptacle 222 substantially uniformly about a circumference of the flexible section 229 circumscribing the longitudinal axis L in the at least one portion of the cavity 230 defined by the flexible section 229. In instances in which the flexible section 229 of the receptacle 222 is substantially uniformly flexible about the circumference, it shall be appreciated that the substantially uniform change in the radial force on the flexible section 229 of the receptacle 222 may facilitate uniformly engaging and disengaging the body portion 115 of the preform 109 in the cavity 230. Uniformly engaging the body portion 115 may facilitate achieving uniform—and, thus, rapid—cooling of the body portion 115 of the preform 109 in the cavity 230. Further, or instead, uniformly disengaging the body portion 115 may reduce the likelihood of the flexible section 229 of the receptacle 22 interfering with insertion of the body portion 115 of the preform into the cavity 230 and/or with removal of the body portion 115 of the preform from the cavity 230.

In certain implementations, the actuator 224 may include a membrane 234 disposed between the base 220 and the flexible section 229 of the receptacle 222, with the membrane 234 and the base 220 defining a channel 235 therebetween. In response to pressure differences between the channel 235 and the at least one portion of the cavity 230 defined by the flexible section 229 of the receptacle 222 (e.g., a pressure different greater than about 2.5 atm and less than about 9 atm, as is a typical range of shop air), movement of the membrane 234 may change the radial force on the flexible section 229 of the receptacle 222. This change in the radial force may elastically deform the flexible section 229 of the receptacle 222 between the expanded state and the compressed state. Further, or instead, the membrane 234 may remain in contact with the flexible section 229 of the receptacle 222 at least in the compressed state of the flexible section 229, as may be useful for holding the flexible section 229 in place along the body portion 115 of the preform 109 at least in the compressed state.

The channel 235 may generally have any shape relative to the flexible section 229 of the receptacle 222 as may be useful for achieving any one or more of various different force distributions on the flexible section 229 of the receptacle. For example, the channel 235 may circumscribe the longitudinal axis L at least along the flexible section 229 of the receptacle 222 to facilitate applying a substantially uniform distribution of radial force about the circumference of the flexible section 229 which, in turn, may be imparted as a substantially uniform radial force distribution about a circumference of the body portion 115 of the preform 109. As a more specific example, the channel 235 may be an annulus about the longitudinal axis L of the cavity 230. That is, pressurized fluid (e.g., pressurized air) may be introduced into one end of the channel 235 (e.g., into an end of the channel 235 adjacent to the second end section 228 of the receptacle 222), move through the channel 235 in a longitudinal direction substantially parallel to the longitudinal axis L, and exit the channel 235 via a second end of the channel 235 (e.g., via an end of the channel 235 adjacent to the first end section 227 of the receptacle 222). As may be appreciated from the foregoing, the channel 235 formed in the shape of an annulus may facilitate achieving rapid changes in pressure in the channel 235 with little or no need for complex plumbing connections.

In some implementations, the flexible section 229 of the receptacle 222 may be biased toward the expanded state in the absence of a pressure difference between the channel 235. Continuing with this example, the at least one portion of the cavity 230 such that delivery of pressurized fluid (e.g., pressurized air) into the channel 235 may generate a radial force to move the flexible section 229 of the receptacle 222 from the expanded state to the compressed state. Continuing still further with this example, as pressure in the channel 235 is reduced (e.g., by interrupting delivery of pressurized fluid into the channel 235), the bias of the flexible section 229 of the receptacle 222 may move the flexible section 229 from the compressed state to the expanded state. Such a combination of pressurized air and spring bias of the flexible section 229 of the receptacle may be useful for achieving bi-directional control of the flexible section 229 using only on/off control of the pressurized air into the channel 235.

The channel 235 defined by the membrane 234 and the base 220 may be fluidically isolated from other fluids used for operation of the cooling device 108 for insertion, cooling, and removal of the body portion 115 of the preform 109. In particular, the channel 235 may be fluidically isolated from the one or more cooling passages 233 defined by the base 220, such as may be useful for managing a first fluid (e.g., pressurized air) for expansion and compression of the flexible section 229 of the receptacle 222 separately from a second fluid (e.g., water or another cooling liquid) used to provide cooling along the cooling passages 233. For example, with the channel 235 fluidically isolated from the one or more cooling passages 233, the flow rate of the second fluid moving through the cooling passages 233 may be changed without impacting the expansion and compression of the flexible section 229 of the receptacle 222 under pneumatic force of the first fluid in the channel 235. Further, or instead, the channel 235 may be fluidically isolated from the at least one portion of the cavity 230 defined by the flexible section 229 of the receptacle 222, as may be useful for separately controlling pressure in the channel 235 relative to pressure in the cavity 230. More specifically, such fluidic isolation may facilitate using pressurized air to control radial force of the channel 235 on the flexible section 229 to achieve efficient cooling of the body portion 115 of the preform while independently using pressurized air/vacuum pressure in the cavity 230 (as described in greater detail below) to facilitate removal and insertion of the body portion 115 of the preform 109 relative to the cavity 230.

The membrane 234 may be generally formed of one or more materials that may be useful for withstanding the conditions experienced by the membrane 234 while also being reliably cyclable between changes in pressure associated with many pressurization and depressurization cycles of the channel 235 during the course of high-volume production. In some instances, the membrane 234 may be pliable along the channel 235 as may be useful for reducing the likelihood of point or line contact with the flexible section 229, thus facilitating more uniform distribution of force about the circumference of the flexible section 229 and reducing the likelihood of certain failure modes associated with point or line contact. Additionally, or alternatively, at a temperature of 100° C., the membrane 234 may be elastically deformable in response to a pressure difference between the channel 235 and the at least one portion of the cavity 230 defined by the flexible section 229 of the receptacle 222, as is useful for moving the flexible section 229 between the expanded state and the compressed state over many cycles without the use of separate moving parts. For example, the membrane 234 may include one or more elastomeric materials (e.g., one or more elastomeric materials that begin melting at temperatures above 100° C., such as rubber). In addition to being cost-effective, such elastomeric materials may withstand degradation through many cycles of expansion, cooling, and compression in the cavity 230.

In general, the base 220 may support the receptacle 222 such that the receptacle 222 may move between the expanded state and the compressed state within the chamber 226 defined by the base 220. Further, or instead, while membrane 234 may flex on one side of the cavity 230, the base 220 may be relatively inflexible compared to the membrane 234. That is, the base 220 may provide a resistance force useful for efficiently directing pressure to the membrane 234, where the pressure may be ultimately directed to the flexible section 229 of the receptacle 222.

In implementations in which the one or more cooling passages 233 are defined by the base 220, the one or more cooling passages 233 may be in thermal communication with the at least one portion of the cavity 230 defined by the flexible section 229 of the receptacle 222 at least in the compressed state of the flexible section 229 of the receptacle 222 in the chamber 226 defined by the base 220. For example, the base 220 and the flexible section 229 of the receptacle 222 may be formed of one or more metals, as may be generally useful for forming an efficient cooling path between the one or more cooling passages 233 and the flexible section 229. In some instances, the one or more cooling passages 233 may be in thermal communication with the at least one portion of the cavity 230 defined by the flexible section 229 via the channel 235 and the membrane 234. That is, in such instances, the at least one portion of the cavity 230 defined by the flexible section 229 may be cooled as cooling fluid (e.g., water) moving through the one or more cooling passages 233 cools air in the channel 235 which ultimately cools the flexible section 229 via contact between the membrane 234 and the flexible section 229 at least in the compressed state of the flexible section 229. While cooling via air in the channel 235 may provide useful cooling, it shall be appreciated that more efficient cooling paths are additionally or alternatively possible, as described in greater detail below.

The one or more cooling passages 233 may be generally arranged in the base 220 to provide any one or more of various different cooling patterns along the receptacle 222 to provide a predetermined cooling profile to the body portion 115 of the preform 109 disposed in the cavity 230 during operation of the cooling device 108. For example, the one or more cooling passages 233 may circumscribe the at least one portion of the cavity 230 defined by the flexible section 229 of the receptacle 222, as may be useful for imparting a circumferentially uniform cooling profile along the cavity 230 defined by the receptacle 222. As a more specific example, the one or more cooling passages 233 may include a helically-shaped cooling passage, as may be useful for imparting a cooling profile that is uniform both circumferentially and longitudinally along the cavity 230 defined by the receptacle 222.

Additionally, or alternatively, the base 220 may facilitate forming plumbing connections associated with the cooling fluid (e.g., water) movable through the one or more cooling passages 233 and/or with the pressurized air/vacuum used for pushing and pulling the body portion 115 of the preform 109 relative to the cavity 230. For example, the second end section 228 of the receptacle 222 may define a second opening 236. Continuing with this example, the base 220 may define at least a portion of a manifold 237 in fluid communication with the cavity 230 via the second opening 236. Continuing still further with this example, pressurized air introduced into the manifold 237 and may move into the cavity 230 via the second opening 236 to facilitate pushing the body portion 115 of the preform 109 out of the cavity 230 with the flexible section 229 of the receptacle 222 in the expanded state. Further, or instead, vacuum pressure in the manifold 237 may be applied to the cavity 230 via the second opening 236 to facilitate pulling the body portion 115 of the preform 109 into the cavity 230 with the flexible section 229 of the receptacle 222 in the expanded state and, in some cases, to hold the body portion 115 of the preform 109 in the cavity 230 with the flexible section 229 of the receptacle 222 in the compressed state as the body portion 115 of the preform 109 is cooled in the cavity 230. In some instances, the second opening 236 may have a cross-sectional area smaller than the first opening 232, as may be useful for accommodating the manifold 237 and other plumbing features in the base 220 while maintaining an overall size of the base 220 to within a size envelope consistent with bases that make use of fixed-size cavities for cooling preforms.

Having described various aspects of the cooling device 108, attention is now directed to certain aspects of using the cooling device 108 for post-mold processing of the preform 109.

Figure 3:
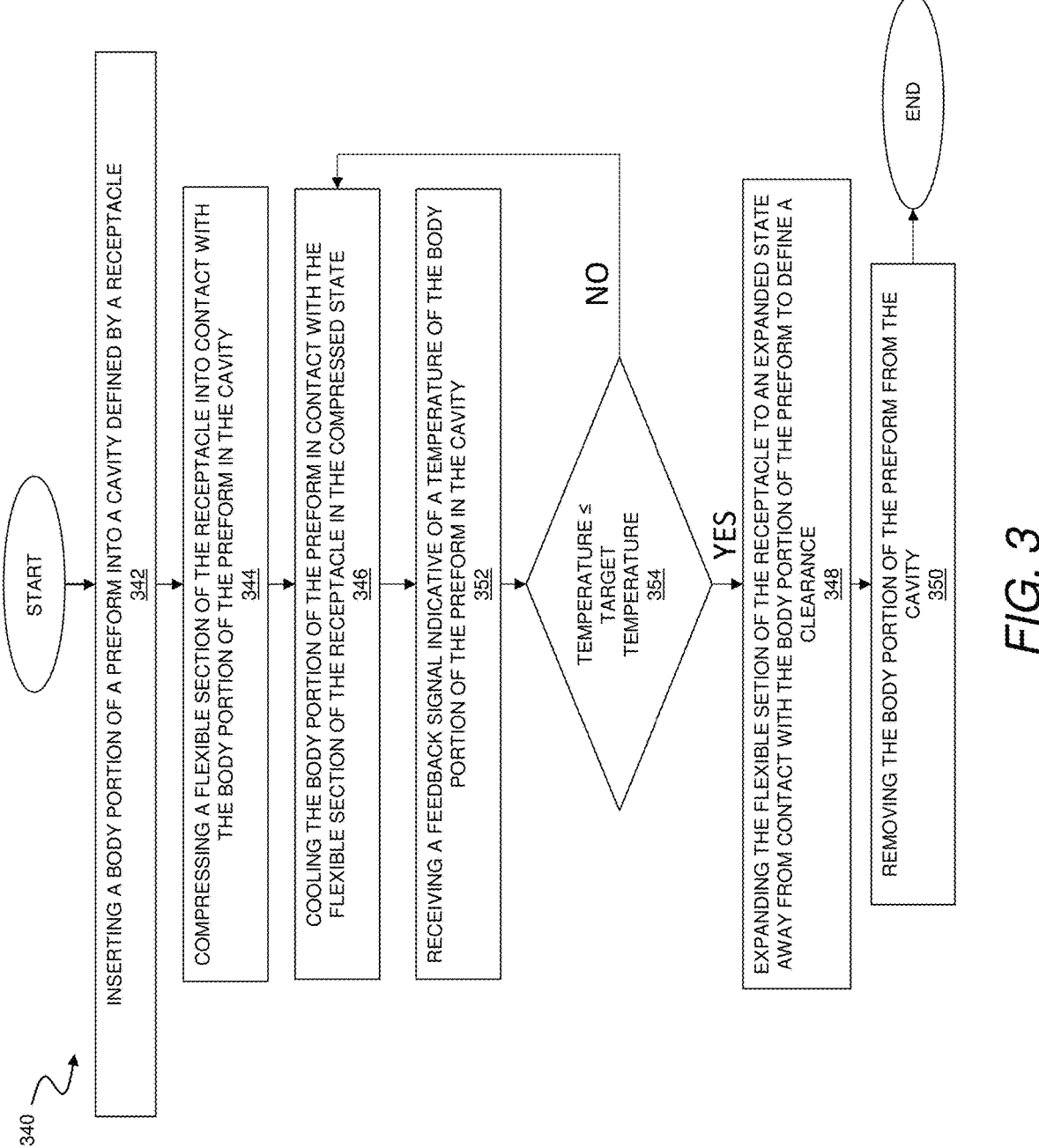
FIG. 3 is a flow chart of an exemplary method of post-mold processing of a preform.

FIG. 3 is a flow chart of an exemplary method 340 of post-mold processing of a preform. For example, the exemplary method 340 may cool the preform 109 (FIGS. 1 and 2A-2D) using the system 100 (FIG. 1) including the cooling device 108 (FIG. 1 and FIGS. 2A-2D. Unless otherwise specified or made clear from the context, it shall be understood that any one or more aspects of the exemplary method 340 may be carried out by the processor 110 (FIG. 1). For example, the one or more non-transitory, computer-readable storage media 112 (FIG. 1) may have stored thereon instructions for causing the processor 110 (FIG. 1) to carry out one or more aspects of the exemplary method 340.

As shown in step 342, the exemplary method 340 may include inserting a body portion of a preform into a cavity defined by a receptacle disposed in a chamber defined by a base. For example, the body portion of the preform may be inserted into the cavity with the clearance defined between a flexible section of the receptacle and the body portion of the preform. Further, or instead, the body portion of the preform may be inserted into cavity with a neck portion of the preform outside of the cavity and the body portion of the preform spaced away from the flexible section of the receptacle in the cavity (e.g., with the flexible section of the receptacle in the expanded state). In some instances, inserting the body portion of the preform into the cavity may include positioning a closed portion of the preform in contact with the receptacle with the body portion of the preform spaced away from the flexible section of the receptacle. As a more specific example, inserting the body portion of the preform into the cavity may include applying vacuum pressure along the closed portion of the preform in contact with the receptacle.

As shown in step 344, the exemplary method 340 may include compressing the flexible section of the receptacle into contact with the body portion of the preform in the cavity. For example, the flexible section of the receptacle may define a longitudinal axis extending through the cavity, and compressing the flexible section of the receptacle into contact with the body portion of the preform in the cavity may include decreasing a radial dimension of the flexible section of the receptacle from the expanded state to the compressed state. As another example, compressing the flexible section of the receptacle into contact with the body portion of the preform in the cavity may include increasing fluid pressure in a channel in mechanical communication with the flexible section of the receptacle. Increasing the fluid pressure in the channel may include directing pressurized air into the channel. In particular, directing pressurized air into the channel may include forming a pressure difference between the channel and the cavity of greater than about 2.5 atm and less than about 9 atm (e.g., a pressure difference that is generally achievable by directing shop air into the channel). In some cases, increasing the fluid pressure in the channel may include increasing the fluid pressure in the channel according to a step function, as may be useful for achieving rapid changes between the expanded state and the compressed state for achieving high-volume throughputs. Additionally, or alternatively, the fluid pressure in the channel may be increased according to a continuous function over a predetermined period, as may be useful for achieving gradual changes between the expanded state and the compressed state for managing stress imparted to machinery and/or to the preform.

As shown in step 346, the exemplary method 340 may include cooling the body portion of the preform in contact with the flexible section of the receptacle in the compressed state. For example, in instances in which the preform is formed of polyethylene terephthalate (PET), cooling the body portion of the preform may shrink the body portion of the preform in the radial dimension, and compressing the flexible section of the receptacle may include reducing the radial dimension of the flexible section of the receptacle by more than 50 percent of shrinkage, in the radial dimension, associated with cooling the body portion of the preform. Further, or instead, cooling the body portion of the preform in contact with the flexible section of the receptacle may include moving a coolant (e.g., water) through a cooling circuit fluidically isolated from the cavity and in thermal communication with the body portion of the preform in the cavity. The cooling circuit may have a maximum pressure of between about 4 atm and about 9 atm, such as may be typical of water from a municipal supply.

As shown in step 348, the exemplary method 340 may include, with the body portion of the preform cooled, expanding the flexible section of the receptacle to an expanded state away from contact with the body portion of the preform to define a clearance therebetween. Expanding the flexible section of the receptacle may include, for example, increasing the radial dimension of the flexible section of the receptacle to move the flexible section of the receptacle from the compressed state to the expanded state, out of contact with the body portion of the preform. In some instances, expanding the flexible section of the receptacle away from contact with the body portion of the preform may include decreasing the fluid pressure in the channel (e.g., by interrupting a flow of fluid into the channel).

As shown in step 310, the exemplary method 340 may include, with the clearance defined between the flexible section of the receptacle and the body portion of the preform, removing the body portion of the preform from the cavity. In some instances, removing the body portion of the preform from the cavity may include delivering pressurized air into the cavity to move the closed portion of the preform away from contact with the receptacle.

In certain implementations, as shown in step 352, the exemplary method 340 may include receiving a feedback signal indicative of a temperature of the body portion of the preform in the cavity. Further, or instead, as shown in step 354, the exemplary method 340 may include expanding the flexible section of the receptacle away from the body portion of the preform based on comparison of the temperature of the body portion to a predetermined target temperature.

Having described various aspects of cooling devices and methods that include pressurization of a channel defined by a membrane, it shall be appreciated that other devices and methods may additionally or alternatively be used to move a flexible section of a receptacle between an expanded state and a compressed state. The cooling devices and methods described below are described separately from the cooling devices and techniques described above for the sake of clear and efficient explanation. Thus, unless otherwise specified, or made clear from the context, it shall be understood that any one or more aspects of the cooling devices and techniques described below may be used in addition to, or instead of, corresponding aspects of the cooling devices and techniques described above.

Referring now to FIGS. 4A-4D, a cooling device 408 may include a base 420, a receptacle 422, and an actuator 424. The receptacle 422 may be disposed in a chamber 426 defined by the base 420. The receptacle 422 may include a first end section 427, a second end section 428, and a flexible section 429 therebetween, with the flexible section 429 defining at least one portion of a cavity 430. As described in greater detail below, the actuator 424 may be actuatable to change radial force on the flexible section 429 of the receptacle 422 such that the flexible section 429 may elastically deform between an expanded state and a compressed state relative to a longitudinal axis L' transverse to the radial force and defined by the cavity 430. The cooling device 408 should be understood to be analogous to or interchangeable with the cooling device 108 of the system 100 (FIG. 1). Further, for the sake of clear and efficient description, elements of the cooling device 408 should be understood to be analogous to or interchangeable with elements of the cooling device 108 corresponding to 200-series element numbers (e.g. in FIGS. 2A-2D) described herein, unless otherwise explicitly made clear from the context and, therefore, are not described separately from counterpart 200-series element numbers expect to note differences and/or to emphasize certain features. Thus, for example, the receptacle 422 of the cooling device 408 shall be understood to be identical to the receptacle 222 (FIGS. 2A-2D), except to any extent indicated or made clear from the context.

In general, the base 420 may include an inner surface 456 having a wedge-shape sloping radially away from the longitudinal axis L' in a direction from the second end section 428 to the first end section 427 of the receptacle 422. The first end section 427 of the receptacle 422 may be supported on the wedge-shape of the inner surface 456 of the base 420 at least with the flexible section 429 of the receptacle 422 in the compressed state. In instances in which the inner surface 456 of the base 420 and the flexible section 429 are each formed of one or more metals, it shall be appreciated that such contact between the inner surface 456 of the base and the flexible section 429 of the receptacle 422 may facilitate efficient heat transfer away from the perform held in the cavity 430 while the flexible section 429 is in the compressed state. That is, as compared to convective heat transfer through a channel as described above, conductive heat transfer resulting from direct contact between the inner surface 456 of the base and the flexible section 429 of the receptacle 422 may facilitate significantly faster and more robust heat transfer away from the preform in the cavity 430 Further, or instead, at least with the flexible section 429 of the receptacle 422 in the compressed state, the actuator 424 may be actuatable to move the receptacle 422 parallel to the longitudinal axis L' such that the flexible section 429 may slide along the wedge-shape of the inner surface 456 of the base 420, with such movement corresponding to expansion of the flexible section 429 of the receptacle 422 from the compressed state to the expanded state.

As an example, the flexible section 429 of the receptacle 422 may include a plurality of struts 431, and a respective longitudinal dimension of an outer surface 455 of each one of the plurality of struts 431 may define a respective axis oblique to the longitudinal axis L' defined by the cavity 430. An angle between the respective axis defined by the outer surface 455 of a given one of the plurality of struts 431 relative to the longitudinal axis L' may increase as the flexible section 429 of the receptacle 422 elastically deforms from the compressed state to the expanded state. That is, through actuation of the actuator 424 to move the receptacle 422 along the longitudinal axis L', the outer surface 455 of each of the plurality of struts 431 may slide along the wedge-shape of the inner surface 456 of the base 420 and, as a given angles between the respective axis defined by the outer surface 455 of each one of the plurality of struts 431 relative to the longitudinal axis L' increases, each one of the plurality of struts 431 assumes an expanded shape.

Figure 4A:
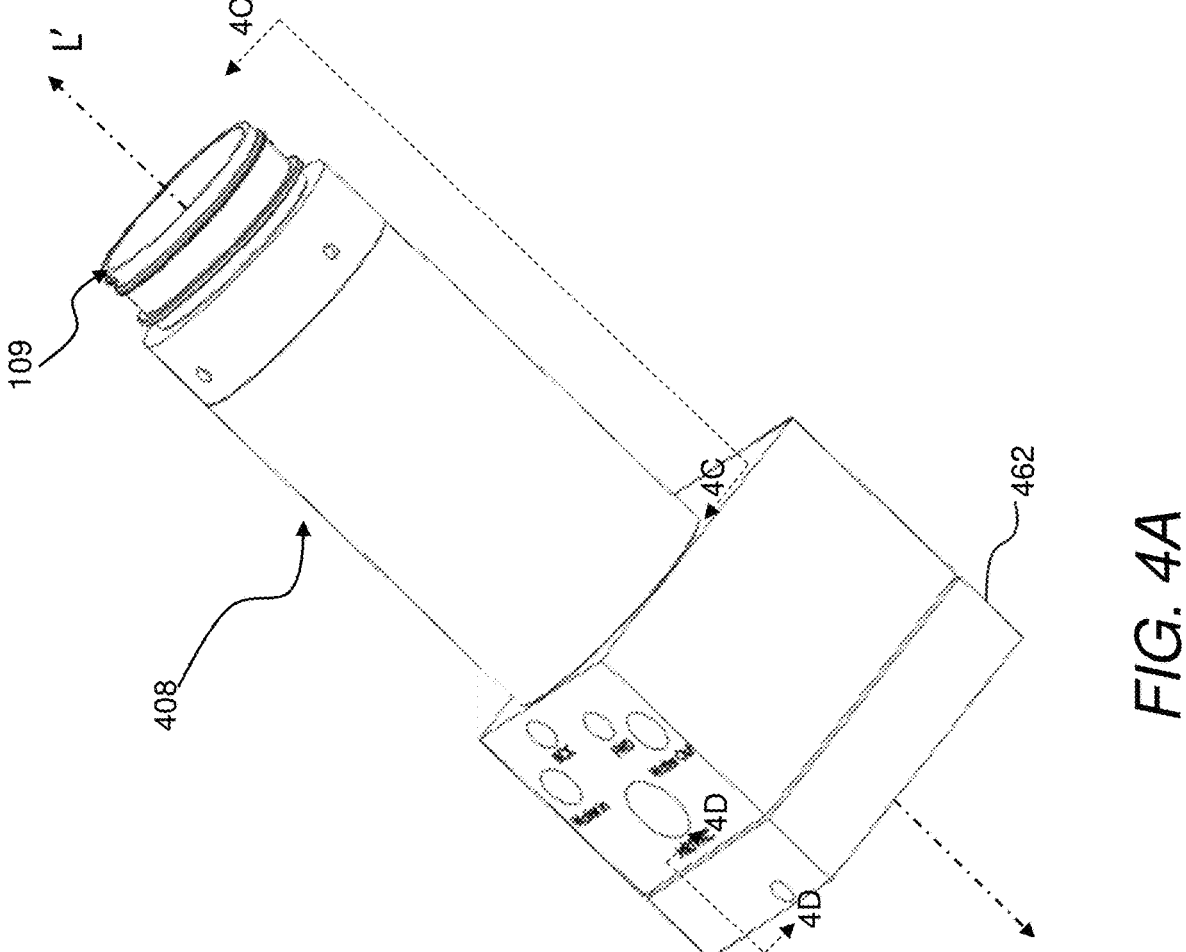
FIG. 4A is a perspective view of a cooling device usable with the system of FIG. 1, the cooling device including a piston and the cooling device shown with a preform relative to the cooling device.
Figure 4B:
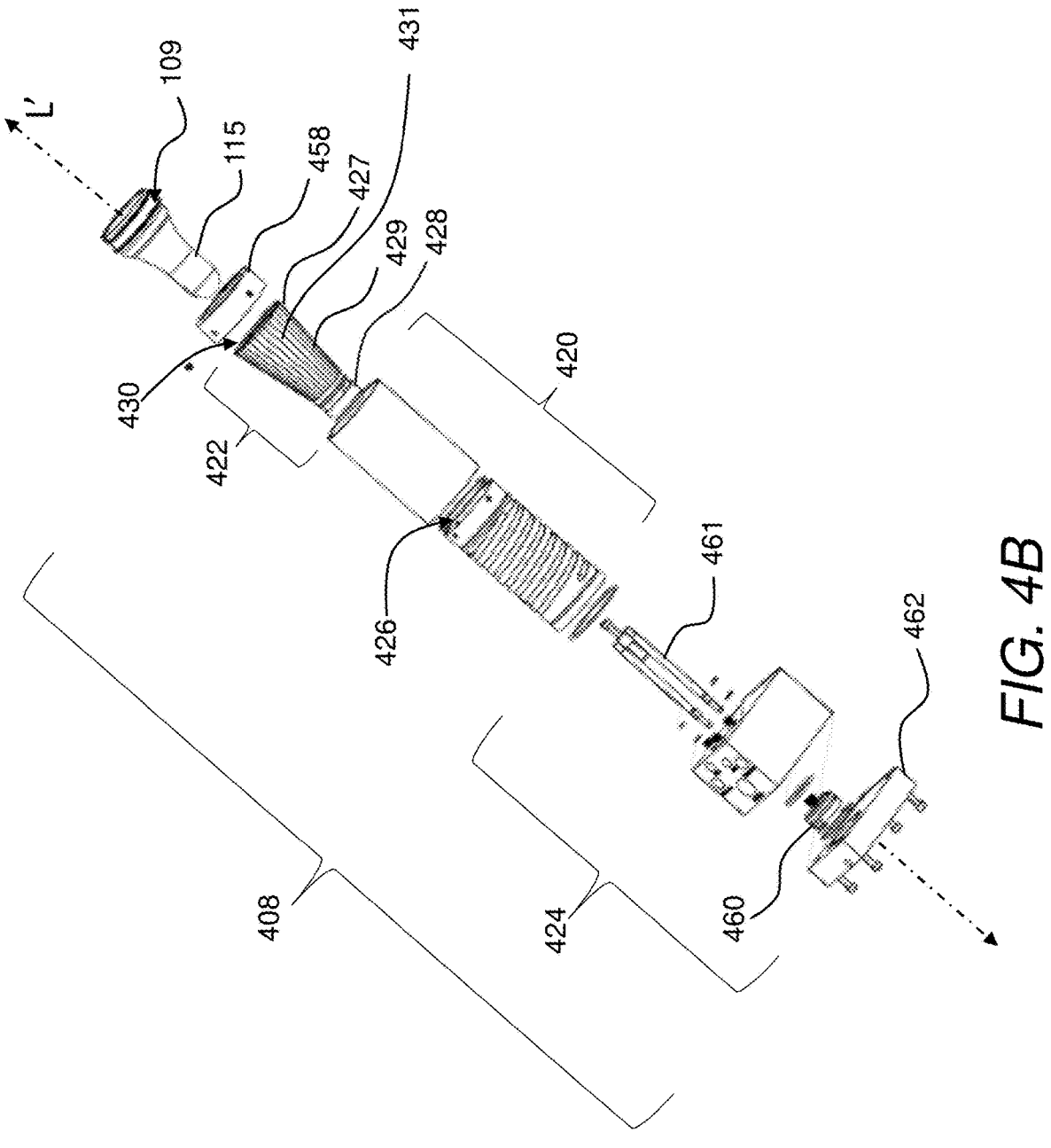
FIG. 4B is a perspective, exploded view of the cooling device and preform of FIG. 4A.
Figure 4C:
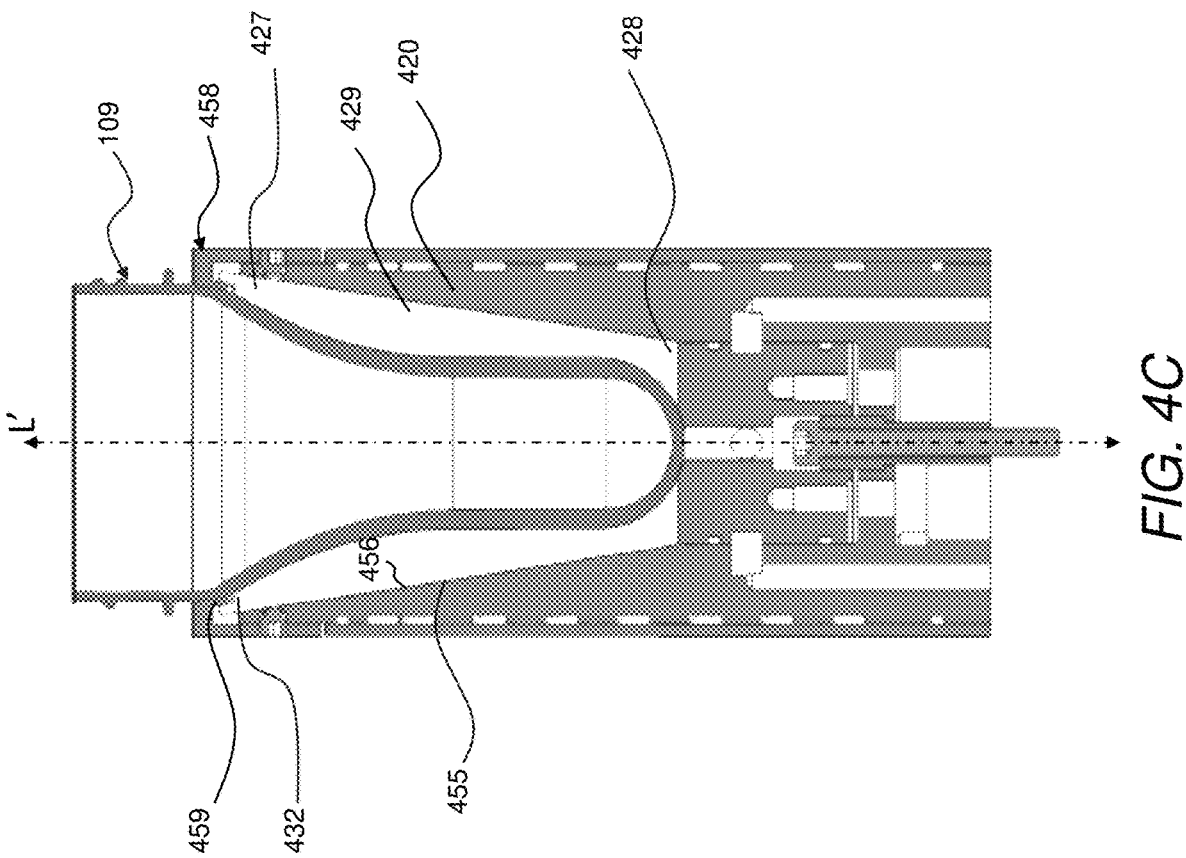
FIG. 4C is a front view of a cross-section of an upper portion of the cooling device and preform of FIG. 4A, with the cross-section taken along 4C-4C in FIG. 4A, shown with connecting rods omitted.
Figure 4D:
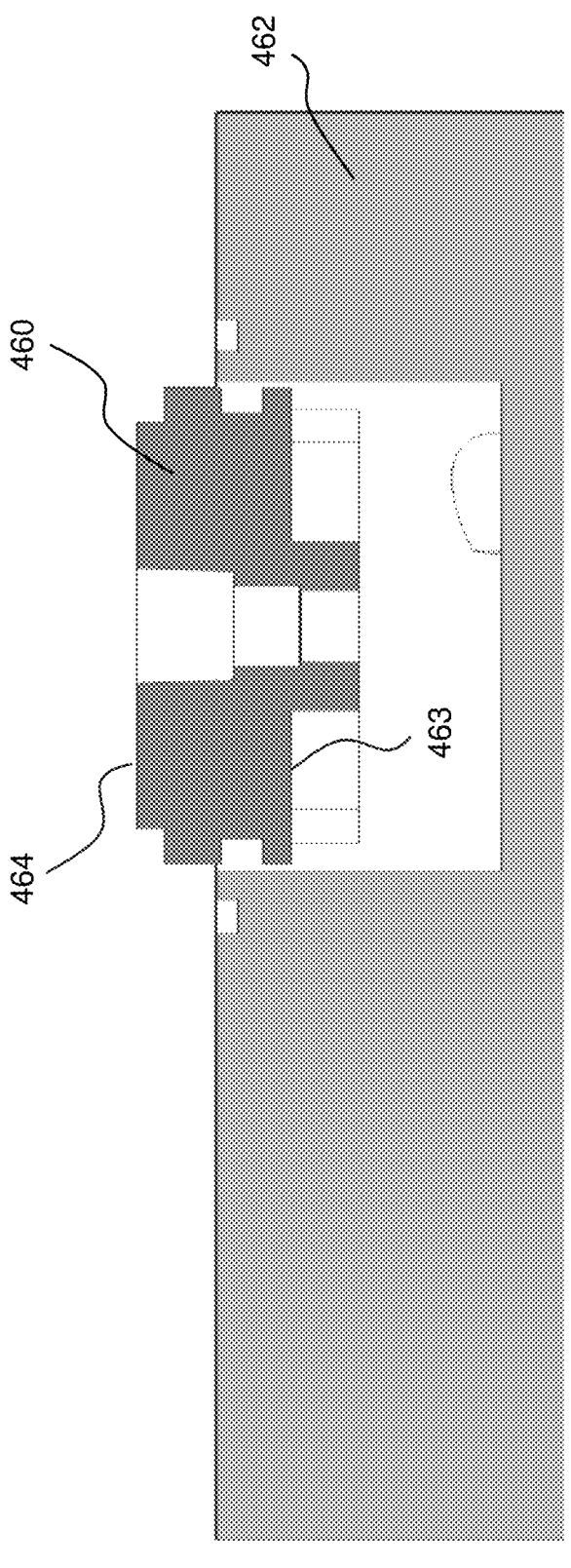
FIG. 4D is a side view of a cross-section of a lower portion of the cooling device of FIG. 4A, with the cross-section taken along 4D-4D in FIG. 4A, shown with connecting rods omitted.

In certain implementations, the movement of the first end section 427 of the receptacle 222 may be restricted in one or more directions to maintain the flexible section 429 of the receptacle 222 in the expanded state. For example, the cooling device 408 may include a cap 458 supported on the base 420. The cap 458 may include a lip 459, and the actuator 424 may be actuatable to move the receptacle 422 in a forward direction along the longitudinal axis L' toward the cap 458. As the receptacle 422 moves in the forward direction, the flexible section 429 of the receptacle 422 may be slidable along the wedge-shape of the inner surface 456 of the base 420 and into engagement with the lip 459. With the flexible section 429 of the receptacle 422 engaged with the lip 459 (as shown in FIG. 4C), radial movement of the flexible section 429 of the receptacle 422 toward the longitudinal axis L' may be restricted such that the lip 459 holds the flexible section 429 of the receptacle 422 in the expanded state. The flexible section 429 of the receptacle 422 may remain in the expanded state as long as the actuator 424 holds the receptacle 422 in the forward position in which the flexible section 429 of the receptacle 422 remains engaged with the lip 459.

Additionally, or alternatively, the actuator 424 may be actuatable to move the receptacle 422 in a backward direction away from the cap 458 along the longitudinal axis L'. As the receptacle 422 moves in the backward direction, the flexible section 429 of the receptacle 422 may disengage from the cap 458. For example, in instances in which the flexible section 429 of the receptacle 422 is held in the expanded state via engagement with the lip 459 of the cap 458, the flexible section 429 of the receptacle 422 may disengage from the lip 459 as the receptacle slides along the wedge-shape of the inner surface 456 of the base 420 and moves in the backward direction. With the flexible section 429 of the receptacle 422 disengaged from the lip 459, the flexible section 429 of the receptacle 422 may move radially inward toward the longitudinal axis L' (e.g., through spring-bias of the flexible section 429 radially inward toward the compressed state) such that the flexible section 429 of the receptacle 422 moves from the expanded state to the compressed state. In the absence of external radial force on the flexible section 429 of the receptacle 422, the outer surface of the flexible section (e.g., the outer surface 455 of the plurality of struts 431) may be frustoconical such that the outer surface 455 of the plurality of struts 431 may rest on the inner surface 456 of the base 420 at least in the compressed state such that the inner surface 456 of the base 420 may restrict unintended movement of the flexible section 429 radially away from the longitudinal axis L'.

In some instances, the cap 458 and the first end section 427 of the receptacle 222 may collectively form a substantially continuous surface adjacent to a first opening 432 defined by the first end section 427 of the receptacle 422. In this context, a substantially continuous surface shall be understood to include a surface that is continuous except for a crease or other similar discontinuity between the cap 458 and the first end section 427 of the receptacle 422. Further, or instead, the cap 458 may form a substantially continuous surface with the first end section 427 of the receptacle 422 in each of the compressed state and the expanded state of the flexible section 429 of the receptacle 422, as may be useful for reducing the likelihood that movement of the flexible section 429 between the expanded state and the compressed state will interfere with the preform in the cavity 430.

In general, the actuator 424 may be actuatable using any one or more types of energy to move the receptacle 422 between the forward direction and the backward direction parallel to the longitudinal axis L' to engage and disengage the flexible section 429 from the cap 458 as described above. For example, the actuator 424 may include a piston 460 in mechanical communication with the receptacle 422 (e.g., via one or more connecting rods 461 extending from the piston 460 to the receptacle 422). The piston 460 may be movable parallel to the longitudinal axis L' to move the receptacle 422 in at least one of the forward direction or the backward direction along the longitudinal axis L'. As compared to other arrangements for transmitting mechanical displacement into movement of the receptacle 422 parallel to the longitudinal axis L', movement of the piston 460 may facilitate achieving efficient transmission of force using few moving parts. For example, the stroke of the piston 460 may be directly translatable into corresponding movement of the receptacle 422 along the longitudinal axis L', as may be useful for reducing mechanical losses. Continuing with this example, the stroke of the piston 460 may be greater than about 0.5 mm and less than about 5 mm (e.g., about 1 mm to about 2 mm), as may be useful for rapidly moving the receptacle 422 between the expanded state and the compressed state.

The piston 460 may be pneumatically actuatable to move the receptacle 422 in at least one of the forward direction or the backward direction along the longitudinal axis L'. To the extent such pneumatic actuation is achieved with pressurized air, it shall be appreciated that this has significant advantages with respect to safety as compared to the use of other types of actuation. Further, or instead, the piston 460 may be pneumatically actuatable with pressurized air having gauge pressure of greater than about 2 atm and less than about 9 atm to move the receptacle 422 in at least one of the forward direction or the backward direction along the longitudinal axis. That is, the piston 460 may be pneumatically actuatable with pressurized air having gauge pressure typical of shop air, which is typically already available in post-mold processing operations, thus reducing or eliminating the need for handling a separate fluid.

While the piston 460 may be pneumatically actuatable to move the receptacle 422 in only one direction in some implementations (e.g., with a spring used in the opposite direction), it shall be appreciated that the piston 460 may be pneumatically actuatable to move the receptacle in each of the forward direction and the backward direction along the longitudinal axis L' in certain implementations. For example, the cooling device 408 may include a piston manifold 462. The piston 460 may have a first side 463 and a second side 464 opposite one another and fluidically isolated from one another in the piston manifold 462. The piston 460 may be pneumatically actuatable to move the receptacle 422 in the forward direction in response to pneumatic pressure directed through the piston manifold 462 to the first side 463 of the piston 460. Further, or instead, the piston 460 may be pneumatically actuatable to move the receptacle 422 in the backward direction in response to pneumatic pressure directed through the piston manifold 462 to the second side 464 of the piston 460.

Having described certain features of the cooling device 408, it shall be appreciated that the cooling device 408 may be used to carry out additional or alternative aspects of the exemplary method 340 (FIG. 30) of post-mold processing of a preform.

Referring again to FIG. 3, it shall be appreciated that compressing the flexible section of the receptacle into the compressed state in contact with the body portion of the preform in the cavity according to step 344 of the exemplary method 340 may additionally, or alternatively include moving the receptacle along a longitudinal axis, with movement of the receptacle along the longitudinal axis increasing a radial force on the flexible section of the receptacle.

As another example, it shall be appreciated that expanding the flexible section of the receptacle to the expanded state away from contact with the body portion of the preform in the cavity according to step 348 of the exemplary method 340 may include moving the receptacle along the longitudinal axis, with movement of the receptacle along the longitudinal axis decreasing the radial force on the flexible section of the receptacle. As a more specific example, compressing the flexible section of the receptacle into the compressed state in contact with the body portion of the preform in the cavity according to step 344 of the exemplary method 340 may include moving the receptacle in a backward direction further into the cavity, and expanding the flexible section of the receptacle to the expanded state away from contact with the body portion of the preform in the cavity according to step 348 of the exemplary method may include moving the receptacle in a forward direction opposite the backward direction. In some instances, moving the receptacle in the forward direction and in the backward direction may include sliding the receptacle along a wedge-shape of an inner surface of the base defining the chamber with the wedge shape sloping radially outward as the receptacle moves in the forward direction. As a specific example, moving the receptacle in at least one of the forward direction or the backward direction may include actuating a piston in mechanical communication with the receptacle. Such actuation of the piston may include pneumatically actuating the piston in at least one of the backward direction or the forward direction and, in some instances, may include pneumatic actuation with air pressurized to gauge pressure greater than about 2 atm and less than about 9 atm.

As another example, the flexible section of the receptacle may be spring-biased toward the compressed state, and expanding the flexible section of the receptacle to the expanded state away from contact with the body portion of the preform in the cavity according to step 348 of the exemplary method 340 may include engaging the flexible section of the receptacle on a lip restricting radial movement of the flexible section of the receptacle toward the compressed state.

While various aspects of systems, methods, and devices for post-mold processing preforms have been described, other aspects are additionally or alternatively possible.

For example, while the flexible sections of receptacles have been described as including struts, other types of flexible sections are additionally or alternatively possible. For example, the flexible section of the receptacle may be continuous along that at least one portion of the cavity defined by the flexible section of the receptacle. In particular, the flexible section may be formed of a thin material that may be readily flexed according any one or more of the various different techniques described herein. As a specific example, the flexible section may be formed of a material having a thickness, in a radial direction, of less than about 25.4 microns along the at least one portion of the cavity defined by the flexible section of the receptacle.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims.

What is claimed is:

1. A cooling device for post-mold processing a preform, the cooling device comprising:
   a base defining a chamber;
   a receptacle disposed in the chamber, the receptacle including a first end section, a second end section, and a flexible section therebetween, the first end section defining a first opening, and the flexible section defining at least one portion of a cavity; and
   an actuator actuatable to change radial force on the flexible section of the receptacle and, in response to the change in radial force on the flexible section of the receptacle, the flexible section of the receptacle is elastically deformable between an expanded state out of contact with the preform and a compressed state into contact with the preform relative to a longitudinal axis transverse to the radial force and defined by the at least one portion of the cavity.

2. The cooling device of claim 1, wherein the base defines one or more cooling passages in thermal communication with the at least one portion of the cavity at least in the compressed state of the flexible section of the receptacle in the chamber defined by the base.

3. The cooling device of claim 1, wherein the base and at least the flexible section of the receptacle are each formed of one or more metals.

4. The cooling device of any one of claim 1, wherein the first end section is wider than the second end section in each of the compressed state and the expanded state.

5. The cooling device of claim 1, wherein at least the second end section is less flexible than the flexible section in response to changes in the radial force on the flexible section of the receptacle.

6. The cooling device of claim 1, wherein, at least in the compressed state of the flexible section of the receptacle, the at least one portion of the cavity is symmetric about any plane containing the longitudinal axis.

7. The cooling device of claim 1, wherein the flexible section of the receptacle includes a plurality of struts along the at least one portion of the cavity, the plurality of struts are flexible in response to the change in radial force on the flexible section of the receptacle.

8. The cooling device of claim 1, wherein the actuator is pneumatically actuatable to move the flexible section of the receptacle between the expanded state and the compressed state.

9. The cooling device of claim 1, wherein the actuator is actuatable to change the radial force on the flexible section of the receptacle substantially uniformly about a circumference of the flexible section circumscribing the longitudinal axis in the at least one portion of the cavity.

10. The cooling device of claim 1, wherein the second end section defines a second opening having a cross-sectional area smaller than the first opening, the base defines at least a portion of a manifold in fluid communication with the cavity via the second opening.

11. The cooling device of claim 1, wherein the actuator includes a membrane disposed between the base and the flexible section of the receptacle, the membrane and the base define a channel therebetween and, in response to pressure differences between the channel and the at least one portion of the cavity, movement of the membrane changes the radial force on the flexible section of the receptacle and elastically deforms the flexible section of receptacle between the expanded state and the compressed state.

12. The cooling device of claim 1, wherein the flexible section changes from the expanded state to the compressed state under a pressure of at least 2.6 atm.

13. A cooling device for post-mold processing a preform, the cooling device comprising:
   a base defining a chamber;
   a receptacle disposed in the chamber, the receptacle including a first end section, a second end section, and a flexible section therebetween, the first end section defining a first opening, and the flexible section defining at least one portion of a cavity; and
   an actuator actuatable to change radial force on the flexible section of the receptacle and, in response to the change in radial force on the flexible section of the receptacle, the flexible section of the receptacle is elastically deformable between an expanded state and a compressed state relative to a longitudinal axis transverse to the radial force and defined by the at least one portion of the cavity,
   wherein the flexible section has a thickness of less than 25.4 microns.

14. The cooling device of claim 13, wherein the flexible section changes from the expanded state to the compressed state under a pressure of at least 2.6 atm.

15. A method of post-mold processing, the method comprising:
   inserting a body portion of a preform into a cavity defined by a receptacle disposed in a chamber defined by a base;
   compressing a flexible section of the receptacle into a compressed state in contact with the body portion of the preform in the cavity;
   cooling the body portion of the preform in contact with the flexible section of the receptacle in the compressed state;
   with the body portion of the preform cooled, expanding the flexible section of the receptacle to an expanded state away from contact with the body portion of the preform to define a clearance therebetween; and
   with the clearance defined between the flexible section of the receptacle and the body portion of the preform, removing the body portion of the preform from the cavity.

16. The method of claim 15, wherein the body portion of the preform is inserted into the cavity with the clearance defined between the flexible section of the receptacle and the body portion of the preform.

17. The method of claim 15, wherein the body portion of the preform is inserted into cavity with a neck portion of the preform outside of the cavity and the body portion of the preform spaced away from the flexible section of the receptacle in the cavity.

18. The method of claim 15, wherein the flexible section of the receptacle defines a longitudinal axis extending through the cavity, and compressing the flexible section of the receptacle into contact with the body portion of the preform in the cavity includes decreasing a radial dimension of the flexible section of the receptacle from the expanded state to the compressed state.

19. The method of claim 15, further comprising receiving a feedback signal indicative of a temperature of the body portion of the preform in the cavity, wherein expanding the flexible section of the receptacle away from the body portion of the preform is based on comparison of the temperature of the body portion to a predetermined target temperature.

20. The method of claim 15, wherein compressing the flexible section of the receptacle into contact with the body portion of the preform in the cavity includes increasing fluid pressure in a channel in mechanical communication with the flexible section.

\* \* \* \* \*